US012698967B2

(12) United States Patent
Parajuli et al.

(10) Patent No.: US 12,698,967 B2
(45) Date of Patent: Aug. 4, 2026

(54) INERTIAL SENSOR WITH FLEXURE ARRANGEMENT AND METHOD

(71) Applicant: Silicon Microgravity Limited, Waterbeach (GB)

(72) Inventors: Madan Parajuli, Cambridge (GB); Ashwin Seshia, Cambridge (GB)

(73) Assignee: Silicon Microgravity Limited, Cambridge (GB)

( * ) Notice: Subject to any disclaimer, the term of this patent is extended or adjusted under 35 U.S.C. 154(b) by 348 days.

(21) Appl. No.: 18/686,706

(22) PCT Filed: Aug. 19, 2022

(86) PCT No.: PCT/GB2022/052152
§ 371 (c)(1),
(2) Date: Feb. 26, 2024

(87) PCT Pub. No.: WO2023/026026
PCT Pub. Date: Mar. 2, 2023

(65) Prior Publication Data
US 2024/0369361 A1 Nov. 7, 2024

(30) Foreign Application Priority Data
Aug. 26, 2021 (GB) ..................................... 2112239

(51) Int. Cl.
*G01C 19/5712* (2012.01)
*G01C 21/00* (2006.01)

(52) U.S. Cl.
CPC ......... *G01C 19/5712* (2013.01); *G01C 21/00* (2013.01)

(58) Field of Classification Search
CPC .... G01P 15/125; G01P 15/18; G01P 15/0802; G01P 21/00; G01P 15/08; G01P 1/023;
(Continued)

(56) References Cited

U.S. PATENT DOCUMENTS 4,718,276 A * 1/1988 Laughlin ................... G01P 3/44
310/11
5,450,751 A 9/1995 Putty et al.
(Continued)

FOREIGN PATENT DOCUMENTS

CA 2927495 A1 * 11/2015
EP 2166308 B1 2/2011
(Continued)

OTHER PUBLICATIONS

Search Report, dated May 30, 2022, for corresponding GB Application No. GB2112239.5.
(Continued)

*Primary Examiner* — Andre J Allen
(74) *Attorney, Agent, or Firm* — Todd A. Serbin; Maynard Nexsen PC

(57) ABSTRACT

An inertial sensor comprising; a central anchor; a proof mass, wherein the proof mass surrounds the central anchor; a flexure; and a plurality of electrodes is disclosed. The flexure has a shape comprising a first plurality of spiral arms, each winding about the central anchor in a first sense, and a second plurality of spiral arms, each winding about the central anchor in a second sense, the second sense being opposite to the first sense Each of the arms are connected between the central anchor and the proof mass. Advantageously, energy lost through anchor losses and thermoelastic dissipation are reduced in this arrangement, resulting in a higher quality factor for the modes of vibration.

20 Claims, 13 Drawing Sheets

(58) Field of Classification Search
CPC ........... G01P 15/097; G01P 2015/0831; G01P
2015/0814; G01P 15/093; G01P 15/14;
G01P 15/02; G01P 2015/0828; G01P
15/123; G01P 15/09; G01P 15/00; G01P
2015/084; G01P 2015/0871; G01P 13/00;
G01P 3/44; G01P 15/135; G01P 15/0888;
G01P 2015/0862; G01P 1/00; G01P
15/131; G01P 2015/0882; G01P 1/003;
G01P 15/0922; G01P 1/006; G01P
15/0891; G01P 2015/0817; G01P
2015/082; G01P 2015/0842; G01P
15/105; G01P 3/00; G01P 15/036; G01P
2015/0837; G01P 15/12; G01P
2015/0865; G01P 15/032; G01P 21/02;
G01P 1/02; G01P 15/03; G01P
2015/0874; G01P 13/025; G01P 15/0907;
G01P 15/11; G01P 15/006; G01P 15/132;
G01P 3/36; G01P 7/00; G01P 15/13;
G01P 2015/0857; G01P 1/026; G01P
2015/088; G01P 2015/0805; G01P
2015/0848; G01P 15/0915; G01P 5/14;
G01P 2015/0845; G01P 15/124; G01P
2015/0808; G01P 3/46; G01P 15/003;
G01P 3/48; G01P 21/025; G01P 3/14;
G01P 15/008; G01P 15/06; G01P 5/26;
G01P 1/07; G01P 3/487; G01P 15/0894;
G01P 5/10; G01P 1/127; G01P 3/02;
G01P 3/50; G01P 5/165; G01P 5/00;
G01P 15/0975; G01P 5/16; G01P 15/038;
G01P 3/42; G01P 2015/0822; G01P
2015/0834; G01P 2015/0854; G01P 5/02;
G01P 15/10; G01P 15/165; G01P 3/443;
G01P 15/16; G01P 2015/086; G01P 3/22;
G01P 3/483; G01P 1/04; G01P 15/005;
G01P 15/122; G01P 2015/0868; G01P
3/488; G01P 2015/0877; G01P 3/4802;
G01P 15/133; G01P 3/465; G01P 3/489;
G01P 3/481; G01P 3/806; G01P 13/0006;
G01P 3/38; G01P 15/034; G01P 15/0885;
G01P 13/02; G01P 3/26; G01P 5/001;
G01P 1/06; G01P 2015/0825; G01P 5/04;
G01P 2015/0851; G01P 3/24; G01P
5/086; G01P 15/001; G01P 3/366; G01P
3/68; G01P 5/18; G01P 15/04; G01P
3/62; G01P 5/08; G01P 5/12; G01P 5/24;
G01P 13/0066; G01P 13/045; G01P
15/0897; G01P 3/58; G01P 5/20; G01P
5/245; G01P 1/12; G01P 13/04; G01P
3/12; G01P 3/486; G01P 3/49; G01P
3/64; G01P 3/803; G01P 5/241; G01C
25/005; G01C 21/165; G01C 25/00;
G01C 21/16; G01C 19/56; G01C
19/5776; G01C 21/20; G01C 19/5719;
G01C 19/5712; G01C 21/005; G01C
19/5783; G01C 21/1652; G01C 21/1656;
G01C 21/166; G01C 19/00; G01C
19/574; G01C 19/5747; G01C 21/183;
G01C 21/206; G01C 21/188; G01C
21/18; G01C 21/28; G01C 19/5769;
G01C 19/5733; G01C 19/5607; G01C
21/1654; G01C 19/5755; G01C 19/5656;
G01C 19/5684; G01C 21/3848; G01C
17/38; G01C 19/58; G01C 19/5726;
G01C 19/5691; G01C 23/00; G01C
21/025; G01C 22/00; G01C 21/30; G01C
21/3804; G01C 21/08; G01C 19/5621;
G01C 5/06; G01C 19/5642; G01C 21/10;
G01C 9/00; G01C 22/006; G01C
21/3841; G01C 19/721; G01C 21/3811;
G01C 19/5614; G01C 21/02; G01C
21/24; G01C 19/5677; G01C 21/12;
G01C 19/5762; G01C 21/26; G01C 9/06;
G01C 3/00; G01C 19/5628; G01C
19/5663; G01C 11/02; G01C 19/64;
G01C 19/72; G01C 21/3602; G01C
19/5705; G01C 21/00; G01C 1/00; G01C
3/08; G01C 21/32; G01C 21/203; G01C
11/00; G01C 19/5649; G01C 21/3415;
G01C 9/02; G01C 19/722; G01C 17/28;
G01C 15/002; G01C 15/00; G01C
21/3697; G01C 19/38; G01C 19/005;
G01C 19/02; G01C 19/04; G01C 21/185;
G01C 21/3407; G01C 19/42; G01C
19/66; G01C 21/34; G01C 21/3446;
G01C 19/5698; G01C 5/00; G01C 19/62;
G01C 21/3881; G01C 9/08; G01C 9/12;
G01C 11/04; G01C 9/10; G01C 19/28;
G01C 19/567; G01C 21/3461; G01C
21/36; G01C 23/005; G01C 11/025;
G01C 19/726; G01C 19/34; G01C 9/18;
G01C 19/727; G01C 11/06; G01C 7/04;
G01C 17/02; G01C 19/70; G01C
21/3815; G01C 21/3844; G01C 19/24;
G01C 21/343; G01C 5/005; G01C 17/00;
G01C 21/3822; G01C 15/06; G01C
21/3826; G01C 11/34; G01C 17/30;
G01C 19/5635; G01C 21/265; G01C
19/661; G01C 21/06; G01C 21/3492;
G01C 21/3867; G01C 13/00; G01C
19/14; G01C 21/383; G01C 21/3438;
G01C 21/3807; G01C 21/3837; G01C
19/08; G01C 19/664; G01C 19/68; G01C
2009/064; G01C 21/3658; G01C 19/16;
G01C 19/60; G01C 21/3484; G01C
21/38; G01C 21/3859; G01C 17/34;
G01C 2009/107; G01C 21/3667; G01C
21/387; G01C 15/006; G01C 19/065;
G01C 21/3885; G01C 15/008; G01C
21/3617; G01C 13/002; G01C 19/20;
G01C 19/30; G01C 2009/062; G01C
2009/066; G01C 21/04; G01C 21/14;
G01C 21/3453; G01C 19/54; G01C
21/3852; G01C 21/3647; G01C 21/3652;
G01C 22/02; G01C 19/22; G01C 19/725;
G01C 19/728; G01C 21/3691; G01C
21/3819; G01C 22/025; G01C 13/004;
G01C 19/44; G01C 11/10; G01C 11/36;
G01C 19/06; G01C 19/18; G01C 9/20;
G01C 11/08; G01C 13/008; G01C
21/365; G01C 21/3833; G01C 15/02;
G01C 19/668; G01C 21/3469; G01C
21/3635; G01C 21/367; G01C 3/02;
G01C 3/06; G01C 19/32; G01C 19/665;
G01C 21/3676; G01C 1/02; G01C 1/04;
G01C 19/662; G01C 21/362; G01C
21/3878; G01C 9/24
See application file for complete search history.

(56) References Cited

U.S. PATENT DOCUMENTS

| | | | |
|---|---|---|---|
| 6,481,285 B1 | 11/2002 | Shkel et al. | |
| 7,040,163 B2 * | 5/2006 | Shcheglov | G01C 19/5684 |
| | | | 73/504.13 |
| 7,637,156 B2 | 12/2009 | Araki et al. | |
| 8,166,816 B2 | 5/2012 | Ayazi et al. | |
| 8,322,213 B2 | 12/2012 | Trusov et al. | |
| 9,970,764 B2 | 5/2018 | Ayazi et al. | |
| 10,502,568 B2 * | 12/2019 | Zotov | G01C 19/5684 |
| 2017/0227572 A1 | 8/2017 | Malvern | |
| 2019/0049247 A1 * | 2/2019 | Huang | H03H 3/0072 |
| 2020/0256676 A1 | 8/2020 | Huang et al. | |

FOREIGN PATENT DOCUMENTS

| | | | |
|---|---|---|---|
| EP | 2191232 B1 | 8/2011 | |
| EP | 3205978 B1 | 4/2020 | |
| GB | 2547415 A * | 8/2017 | G01P 15/125 |
| WO | 2006006597 A1 | 1/2006 | |

OTHER PUBLICATIONS

International Search Report and Written Opinion of the International Searching Authority, mailed Nov. 22, 2022, for corresponding International Application No. PCT/GB2022/052152.

Lin, et al., "Methods for enhanced electrical transduction and characterization of micro mechanical resonators," Sensors and Actuators A: Physical, .2010, pp. 263-272.

* cited by examiner

INERTIAL SENSOR WITH FLEXURE ARRANGEMENT AND METHOD

FIELD OF THE INVENTION

The invention relates to gyroscopic inertial sensors and methods of inertial sensing.

BACKGROUND TO THE INVENTION

Inertial sensors are in wide use for a variety of motion sensing applications. Examples of these applications include, but are not limited to, independent navigation system for autonomous surface/subsurface navigation, in geo-referencing, mapping and surveying, and in high-end industrial, transportation, aerospace, and automotive applications.

Gyroscopic inertial sensors are considered a subclass of inertial sensors, which provide information about angular motion such as the rate or angle of rotation. With the development of modern manufacturing methods, it is becoming increasingly common for these gyroscopic inertial sensors to be MEMS-based. For example a MEMS-based gyroscopic inertial sensor is described in U.S. Pat. No. 7,637,156. These sensors such as the sensor disclosed in U.S. Pat. No. 7,637,156, typically comprise an axisymmetric structure is coupled to a substrate at one or more anchor point(s) via a flexure arrangement, all arranged in a plane. Perfectly axisymmetric structures can possess so-called degenerate modes of vibration whose natural frequencies are matched, one designated as the drive mode and the other designed as the sense mode in a Coriolis vibratory gyroscope implementation. Electrodes are then used to drive the ring portion in a driving mode of vibration within the plane. When rotation is applied to the sensor about an axis perpendicular to the plane, Coriolis forces couple energy into a sensing mode of vibration. A separate set of electrodes are then used for the capacitive sensing of the vibrational response of the ring portion in the sensing mode, allowing the detection and calculation of an angular velocity or angular acceleration.

However, in the described sensors, energy losses occur due to a number of factors, including due to energy dissipation in the sensor flexures and at the substrate anchors. These energy losses result in a lower quality factor of the vibrational modes of interest. A high quality factor translates to superior sensor performance.

Additionally, gyroscopic resonant sensors with vibrational modes with high quality factors can also be used in can be used in high-end resonant sensing and timing and frequency control applications.

It would therefore be desirable to produce an inertial sensor with a flexure arrangement that minimises energy dissipation, and results in an inertial sensor constructed from an axisymmetric structure possessing degenerate or near-degenerate vibrational modes with high quality factors.

SUMMARY OF THE INVENTION

The present invention is defined in the appended independent claims, to which reference should now be made.

In a first aspect, the invention comprises an inertial sensor comprising: a central anchor; a proof mass, wherein the proof mass surrounds the central anchor; a flexure, the flexure having a shape comprising a first set of spiral arms, the first set of spiral arms comprising a first plurality of N spiral arms and a second plurality of N spiral arms, where N is an integer greater than 1, each of the arms connected between the central anchor and the proof mass and lying in a first plane, each of the arms of the first plurality of N spiral arms winding about the central anchor in a first sense and each of the arms of the second plurality of N spiral arms winding about the central anchor in a second sense, the second sense being opposite to the first sense; and a plurality of electrodes comprising at least one drive electrode for driving the proof mass in a first mode of vibration, and at least one sense electrode for sensing a response of the proof mass in a second mode of vibration.

This arrangement of the first and second pluralities of spiral arms is advantageous as it contributes to minimising anchor losses, resulting in an inertial sensor with modes of vibration with high quality factors. As used herein, the term 'spiral' means a shape generated by a point moving around a fixed point while continuously receding from or approaching the fixed point, such that the distance from the fixed point to each and every point on the spiral is of different length.

The flexure may have a shape such that the arms of the first plurality of N spiral arms are equally spaced at 360/N degree intervals about the central anchor. The flexure may have a shape such that the arms of the second plurality of N spiral arms are equally spaced at 360/N degree intervals about the central anchor. Either of these features are advantageous, as they allow for modes of vibration with high quality factors to be generated.

The flexure may have a shape such that each of the arms in the first plurality of N spiral arms meets or crosses all of the arms from the second plurality of N spiral arms at least once. This arrangement of the first and second pluralities of spiral arms enables a symmetric arrangement of flexures supporting the outer mass. This provides the desired degenerate or near-degenerate modes and provides robustness to both in-plane and out-of-plane shock and vibration.

The flexure may be formed from a single piece of a material such as single-crystal silicon. The points where the first plurality of N spiral arms meets or crosses with the arms from the second plurality of N spiral arms may be in the first plane. Advantageously, either of these features may simplify manufacturing of the inertial sensor and/or ensure robustness of the flexure. The flexure may have a uniform thickness. Thickness is defined in the direction perpendicular to the first plane.

The flexure may exhibit N-fold rotational symmetry about an axis perpendicular to the first plane. Preferably, the central anchor, flexure and proof mass each exhibit N-fold rotational symmetry about an axis perpendicular to the first plane. Advantageously, this allows for degenerate or near-degenerate modes of vibration with high quality factors to be generated.

Each arm may have a first end connected to the central anchor and a second end connected to the proof mass, wherein the first end connects to the central anchor at a point on the central anchor that is furthest from the second end of the arm.

Each arm may have the first end directly connected to the central anchor. Advantageously, this feature may result in higher quality factors for the modes of vibration. Alternatively each arm may have the first end connected to the central anchor via another component of the inertial sensor.

Each arm may have the second end directly connected to the proof mass. Alternatively each arm may have the second end connected to the proof mass via another component of the inertial sensor. Advantageously, this may result in higher quality factors for the modes of vibration.

The flexure may have a shape that comprises a second set of spiral arms nested concentrically around the first set of spiral arms. The second set of spiral arms advantageously comprises a first plurality of N spiral arms and a second plurality of N spiral arms, each of the arms of the first plurality of N spiral arms winding about the central anchor in a first sense and each of the arms of the second plurality of N spiral arms winding about the central anchor in a second sense, the second sense being opposite to the first sense. The arms of the second set of spiral arms may have a different curvature or shape to the arms of the first set of spiral arms.

The flexure may have a shape that comprises further sets of spiral arms, wherein the sets of spiral arms are concentrically nested.

The flexure may have a shape comprising a plurality of nested quatrefoils. Each quatrefoil may be rotated by 45 degrees relative to adjacent quatrefoils. A quatrefoil is defined as the outer perimeter of four partially overlapping identical shape. A quatrefoil therefore comprises four lobes, and has 4-fold rotational symmetry about the centre of the quatrefoil. Examples of the identical shapes may include but are not limited to; circles, ellipses, Reuleaux triangles, and other Reuleaux polygons. The central anchor may be located at the centre of the quatrefoils. The proof mass may surround all of the quatrefoils. The proof mass may be connected to a quatrefoil at four points. Preferably, the proof mass is connected to an outermost quatrefoil. More preferably, the proof mass is connected to an outermost quatrefoil at the outermost points of each lobe of the outermost quatrefoil.

Preferably, the flexure has a shape comprising four nested quatrefoils, with each quatrefoil rotated by 45 degrees relative to adjacent quatrefoils. The flexure may have a shape comprising a plurality of nested quatrefoils, with each quatrefoil rotated by 45 degrees relative to adjacent quatrefoils as a result of the arrangement of the first plurality of N spiral arms and the second plurality of N spiral arms, as described above.

The proof mass may be ring shaped. The proof mass may have an inner diameter of between 0.1 millimetre and 10 millimetres. Preferably, the proof mass has an inner diameter between 0.5 millimetres and 9 millimetres.

The proof mass may have an outer diameter between 1 millimetre and 20 millimetres. Preferably, the proof mass has an outer diameter between 1 millimetre and 10 millimetres.

The width of the proof mass may be measured as between the inner diameter and the outer diameter. The width of the proof mass may be between 19 millimetres and 0.05 millimetres. The width of the proof mass may be between 10 millimetres and 0.1 millimetres. Preferably, the width of the proof mass is between 5 millimetres and 0.5 millimetres. More preferably, the width of the proof mass is between 4 millimetres and 1. millimetre. Even more preferably, the width of the proof mass is between 2.5 millimetres and 1 millimetres. Advantageously, these widths of the proof mass, particularly the preferred widths of the proof mass, may achieve low thermo-elastic dissipation and high quality factors of the inertial sensor. This enables high mechanical sensitivity and excellent signal-to-noise ratio for the gyroscope.

The thickness of the proof mass may be greater than the thickness of the flexure. Advantageously, this improves the sensitivity and noise performances of the inertial sensor. The proof mass may have a thickness between 0.5 micrometres and 1000 micrometres. The flexure may have a thickness between 0.5 micrometres and 400 micrometres.

The proof mass may have a first mass. The flexure may have a second mass. The proof mass and the flexure together may have a combined mass equal to the sum of the first mass and the second mass. The first mass may be between 50% and 99.9% of the combined mass. The first mass may be between 75% and 99.5% of the combined mass. Preferably, the first mass is between 90% and 99% of the combined mass. More preferably, the first mass is between 95% and 99% of the combined mass.

The proof mass may have a first volume. The flexure may have a second volume. The proof mass and the flexure together may have a combined volume equal to the sum of the first volume and the second volume. The first volume may be between 50% and 99.9% of the combined volume. The first volume may be between 75% and 99.5% of the combined volume. Preferably, the first volume is between 90% and 99% of the combined volume. More preferably, the first volume is between 95% and 99% of the combined volume.

Advantageously, the first mass being a significant proportion of the combined mass, or the first volume being a significant proportion of the combined volume, may result in an inertial sensor with low thermo-mechanical noise, and may provide good immunity to fabrication tolerances, and so may achieve a low as-fabricated frequency split between degenerate and near-degenerate modes of vibration. This may enable relative ease of mode-matching during device operation. This enables high mechanical sensitivity and excellent signal-to-noise ratio for the gyroscope.

The proof mass may have an aspect ratio of between 1 and 20. The aspect ratio may be defined as the ratio of the width of the proof mass to the thickness of the proof mass. Preferably, the proof mass has an aspect ratio of between 2 and 10. More preferably, the proof mass has an aspect ratio of between 4 and 8. Advantageously, such an aspect ratio allows for the first mass to be significant proportion of the combined mass, which may result in an inertial sensor with a high quality factor, whilst also allowing the inertial sensor to retain a relatively low thickness.

Advantageously, these dimensions allow for the inertial sensor to correspond to dimensions used in popular MEMS manufacturing techniques, allowing ease of manufacturing.

The flexure may have a shape further comprising a plurality of N radial spokes, wherein each of the radial spokes are connected to the proof mass. Advantageously, a plurality of N radial spokes contributes to minimising anchor losses, resulting in an inertial sensor with modes of vibration with high quality factors.

Each of the radial spokes may be connected to at least one arm from the first plurality of N spiral arms or the second plurality of N spiral arms. Preferably, each of the radial spokes are connected to at least one arm from the first plurality of N spiral arms and at least one arm from the second plurality of N spiral arms. The N radial spokes may be connected to the proof mass and spaced at 360/N degree intervals about the central anchor. Each of the N radial spokes may be connected to an outermost quatrefoil. Preferably, each of the N radial spokes are connected to an outermost quatrefoil at the outermost points of each lobe of the outermost quatrefoil.

The width of each of the radial spokes of the plurality of N radial spokes may be between 2 micrometres and 500 micrometres. Preferably, the width of each of the radial spokes of the plurality of N radial spokes is between 2 micrometres and 500 micrometres. The width of each of the arms of the first plurality of N arms and of the second plurality of N arms may be between 2 micrometres and 500 micrometres. Preferably, the width of each of the arms of the first plurality of N arms and of the second plurality of N arms is between 5 micrometres and 200 micrometres. Width is defined in a direction parallel to the first plane. The plurality of N radial spokes contributes to minimising anchor losses, resulting in an inertial sensor with vibrational modes with high quality factors.

N may be an integer multiple of 4. Preferably, N is equal to 4.

Advantageously, the flexure and the proof mass may be integrally formed. Also advantageously, the flexure and the proof mass may be formed from a single piece of a material. Either, or both, of these two features allow for simplification of manufacturing and reduce the likelihood of manufacturing defects, minimising the splitting of vibrational modes. Preferably, the material is silicon. Silicon may be selected due to the ease of manufacturing and etching. The material may also comprise a buried silicon dioxide layer integrated between two distinct layers of single-crystal silicon if the starting substrate is a silicon-on-insulator (SOI) wafer.

The plurality of electrodes may comprise at least one electrode positioned outside of the proof mass. The plurality of electrodes may comprise X electrodes positioned outside of the proof mass, wherein X is an integer multiple of 4. X may be equal to 24. In this context, outside of the proof mass is defined by a component being located outside a region defined by an outer perimeter of the proof mass, when viewing the inertial sensor perpendicular to the first plane.

The plurality of electrodes comprising an integer multiple of 4 electrodes positioned outside of the proof mass allows for independent driving of the first mode of vibration and measurement of the response from the second mode of vibration. Additionally, the plurality of electrodes comprising 24 electrodes positioned outside of the proof mass enables selective tuning of the frequency of one mode of vibration with respect to the other mode of vibration, to match the frequencies of the two modes of vibration. This is referred to as mode-matching. Mode-matching enhances the sensitivity of the inertial sensor.

The plurality of electrodes may comprise at least one electrode positioned inside of the proof mass. The plurality of electrodes may comprise Y electrodes positioned inside the proof mass, wherein Y is an integer multiple of 4. Y may be equal to 12. In this context, inside of the proof mass is defined by a component being located within a region defined by an inner perimeter of the proof mass, when viewing the inertial sensor perpendicular to the first plane. Advantageously, having at least one electrode positioned inside of the proof mass, in addition to electrodes outside the proof mass, provides additional tunability of the inertial sensor and an increased transduction area, and may cancel capacitive feedthrough effects.

The inertial sensor may be a micro-electro-mechanical system or MEMS device. The inertial sensor may be a gyroscopic sensor.

The first mode of vibration and the second mode of vibration may both be cos (nθ) modes, where n is an integer greater than or equal to 1. Preferably, the first mode of vibration and the second mode of vibration are cos (3θ) modes. Advantageously, cos (3θ) modes of the described inertial sensor display high quality factors.

In a second aspect, the invention comprises an inertial sensor comprising: a central anchor; a proof mass, wherein the proof mass surrounds the central anchor; and a flexure connected between the proof mass and the central anchor, wherein the proof mass is suspended from the central anchor by the flexure, the flexure having a shape comprising a plurality of nested quatrefoils.

Each quatrefoil may be rotated by 45 degrees relative to adjacent quatrefoils. A quatrefoil is defined as the outer perimeter of four partially overlapping identical shape. A quatrefoil therefore comprises four lobes, and has 4-fold rotational symmetry about the centre of the quatrefoil. Examples of the identical shapes may include but are not limited to; circles, ellipses, Reuleaux triangles, and other Reuleaux polygons. The central anchor may be located at the centre of the quatrefoils. The proof mass may surround all of the quatrefoils. The proof mass may be connected to a quatrefoil at four points. Preferably, the proof mass is connected to an outermost quatrefoil. Preferably still, the proof mass is connected to an outermost quatrefoil at the outermost points of each lobe of the outermost quatrefoil.

Preferably, the flexure has a shape comprising four nested quatrefoils, with each quatrefoil rotated by 45 degrees relative to adjacent quatrefoils. The flexure may have a shape comprising a plurality of nested quatrefoils, with each quatrefoil rotated by 45 degrees relative to adjacent quatrefoils as a result of the arrangement of the first plurality of N spiral arms and the second plurality of N spiral arms as described above.

In a third aspect, the invention comprises a navigation system comprising an inertial sensor as described in any embodiment according to the first or second aspect of the invention.

In a fourth aspect, the invention comprises a method of inertial sensing using an inertial sensor as described in any embodiment according to the first or second aspect of the invention, the method comprising the steps of; driving the proof mass in the first mode of vibration using at least one drive electrode; sensing the response of the proof mass in a second mode of vibration using at least one sense electrode; and tuning the frequency of the first mode of vibration with respect to the second mode of vibration or tuning the frequency of the second mode of vibration with respect to the first mode of vibration to match the frequencies of the first mode of vibration and the second mode of vibration; and calculating the value of an input measurand based on the response of the proof mass in the second mode of vibration.

The value of the input measurand may be calculated based on the difference between the resonant frequency of the first mode and the resonant frequency of the second mode. Advantageously, this enables high dynamic range measurements and offers the potential for a reduced temperature dependence of scale factor.

Features described with reference to one aspect may be applied to any other aspect of the invention.

BRIEF DESCRIPTION OF THE DRAWINGS

Examples will now be further described with reference to the figures in which.

DETAILED DESCRIPTION

Figure 1:
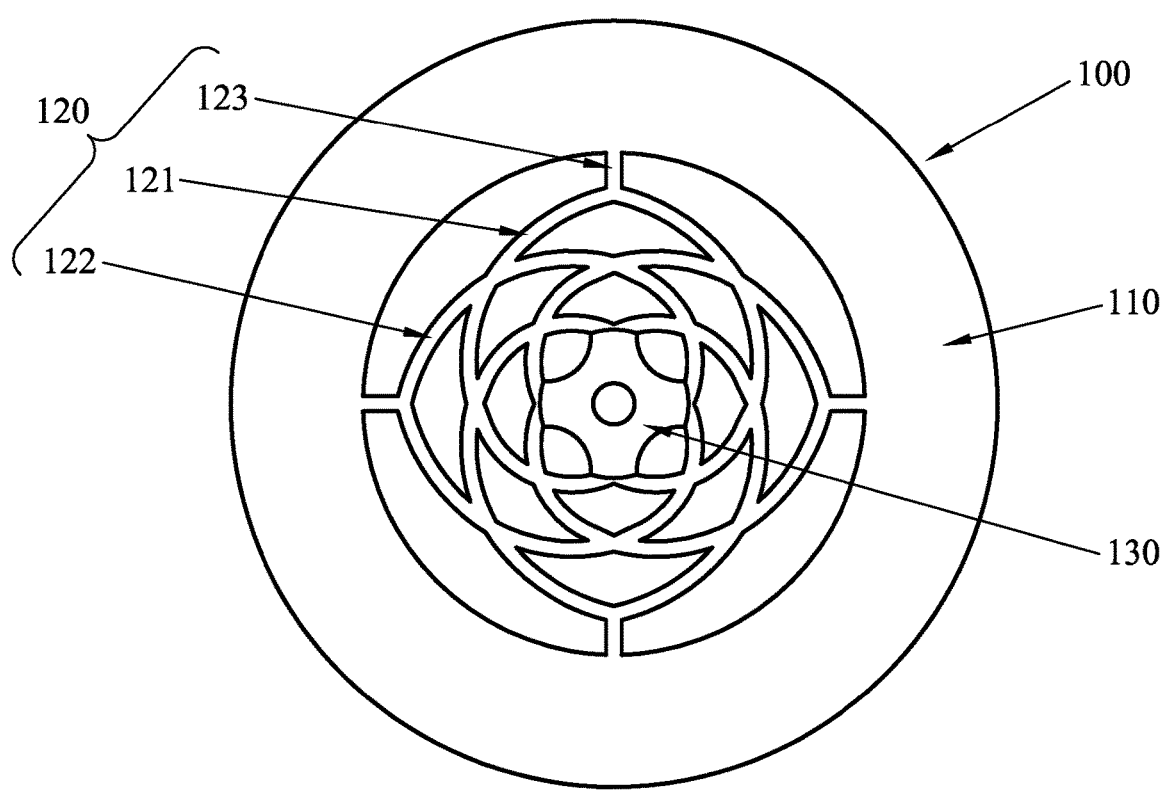
FIG. 1 shows a top view of an inertial sensor according to a first embodiment of the first or second aspect of the invention.
Figure 2:
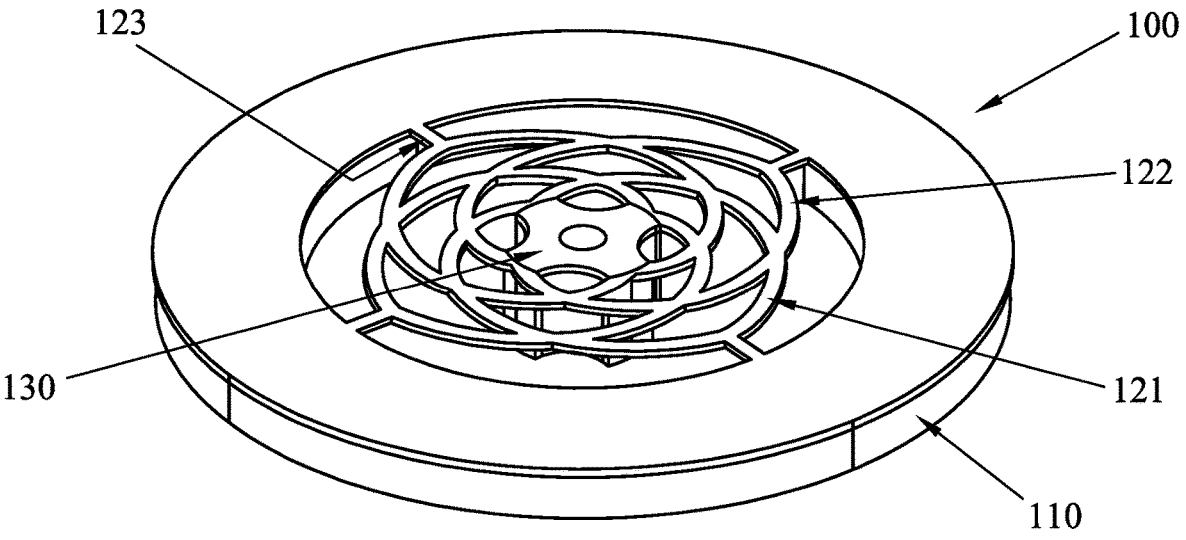
FIG. 2 shows a perspective view of an inertial sensor according to a first embodiment of the first or second aspect of the invention.

FIGS. 1 and 2 are schematic illustrations of a plan view and a perspective view respectively of an inertial sensor 100 in accordance with a particular embodiment of the invention. The inertial sensor 100 comprises a central anchor 130, a ring shaped proof mass 110, and a flexure 120. The central anchor 130 is attached to a substrate (not shown). Flexure 120 is connected to both the central anchor and the proof mass. Flexure 120 further comprises a first plurality of four spiral arms 121, a second plurality of four spiral arms 122, and four radial spokes 123. The first plurality of four spiral arms 121, the second plurality of four spiral arms 122, and the four radial spokes 123 all lie in a first plane, the first plane being the plane of the paper in FIG. 1.

Each of the arms of the first plurality of four spiral arms 121 wind about the central anchor 130 in a first clockwise sense, when viewed from the perspective of FIG. 1. Each of the arms of the second plurality of four spiral arms 122 wind about the central anchor 130 in a second anticlockwise sense, when viewed from the perspective of FIG. 1. The second sense is therefore opposite to the first sense.

Each of the arms from the first plurality of four spiral arms 121 and the second plurality of four spiral arms 122 are directly connected at a first end to the central anchor 130.

Each of the arms of the first plurality of four spiral arms 121 and the second plurality of four spiral arms 122 are also indirectly connected at a second end to the proof mass 110. This indirect connection is via the four radial spokes 123. Each of the four radial spokes 123 are directly connected to the proof mass 110, one arm from the first plurality of four spiral arms 121, and one arm from the second plurality of four spiral arms 122. The four radial spokes 123 are equally spaced at 90 degree intervals about the central anchor 130.

The connection point of each of the arms to the central anchor 130 is at a point on the central anchor 130 that is furthest from the second end of the arm in question. This may be described as the arms completing 180 degrees of winding, as the length of each arm in both the first and second pluralities of four spiral arms 121, 122 traces an arc of 180 degrees about a point centred on the central anchor.

In this particular embodiment of the invention, the first plurality of four spiral arms 121, the second plurality of four spiral arms 122, and the four radial spokes 123 are all integrally formed from a single piece of material. As these components of the flexure all lie in the first plane, and the flexure has a consistent thickness, the points at which arms from the first plurality of four spiral arms 121 and the second plurality of four spiral arms 122 meet or cross also lie in the first plane. This may be referred to as the superposition of the first plurality of four spiral arms 121 and the second plurality of four spiral arms 122.

In the embodiment of FIGS. 1 and 2 the proof mass is also integrally formed with the flexure. The proof mass and flexure may be formed from silicon. The dimensions of the flexure and proof mass are such that over 90% of the total combined mass of the flexure and proof mass is in the proof mass.

An alternative way to describe the shape of a portion of the flexure 120 in FIGS. 1 and 2 is that it is a plurality of concentrically nested quatrefoils. The arms of the first plurality of four spiral arms 121 and the second plurality of four spiral arms 122 intersect in such a way that the flexure may be viewed to comprise four concentrically nested quatrefoils, with concentrically adjacent quatrefoils rotated by 45 degrees relative to each other. The points at which arms from the first plurality of four spiral arms 121 and the second plurality of four spiral arms 122 meet or cross are the points at which concentrically adjacent quatrefoils meet. It would be appreciated by a person skilled in the art that a similar flexure shape may be formed from a different integer number of concentrically nested quatrefoils, and provide the same advantage of a high quality factor.

The nested quatrefoils do not need to be shaped to provide continuous spiral arms extending from one quatrefoil to the next, as shown in FIGS. 1 and 2. Instead, the quatrefoils may be shaped to give rise to concentrically nested arrangements of sets of spiral arms, the spiral arms in each set of spiral arms having a different shape or curvature to the spiral arms in an adjacent set of spiral arms. Each set of spiral arms comprises a first plurality of N spiral arms and a second plurality of N spiral arms, where N is an integer greater than 1, each of the arms of the first plurality of N spiral arms winding about the central anchor in a first sense and each of the arms of the second plurality of N spiral arms winding about the central anchor in a second sense, the second sense being opposite to the first sense. Each set of spiral arms may define a quatrefoil. Each spiral arm in each set of spiral arms connects, at least at one end, to two spiral arms in another set of spiral arms.

Figure 3:
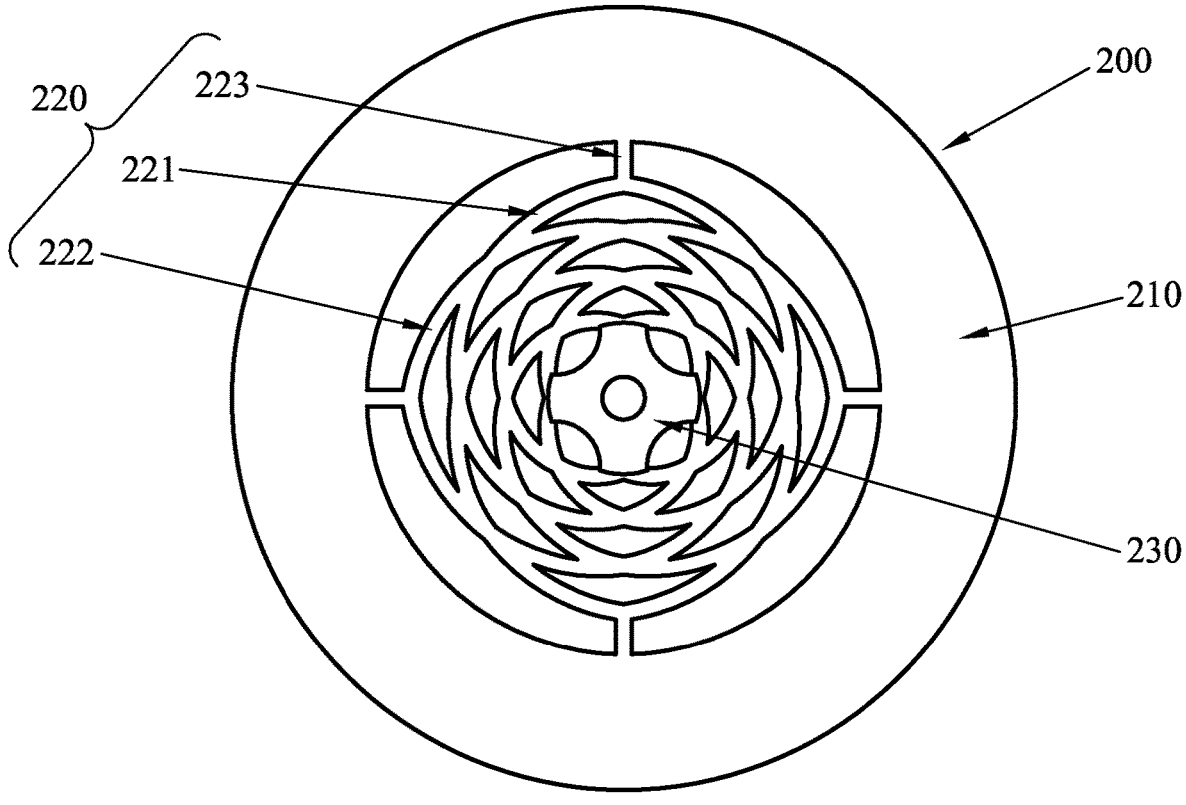
FIG. 3 shows a top view of an inertial sensor according to a first alternative embodiment of the first or second aspect of the invention.

FIG. 3 is a schematic illustration of a plan view of an inertial sensor 200 in accordance with an alternative embodiment of the invention. The inertial sensor 200 of this alternative embodiment also comprises a central anchor 230, a ring shaped proof mass 210, and a flexure 220. The proof mass 210 and central anchor 230 are identical to that of the embodiment shown in FIGS. 1 and 2. The flexure 220 further comprises a first plurality of four spiral arms 221, a second plurality of four spiral arms 222, and four radial spokes 223, similar to that of the embodiment shown in FIGS. 1 and 2.

The embodiment in FIG. 3 differs from the embodiment shown in FIGS. 1 and 2 in the degrees of winding of each of the arms about the central anchor. In the embodiment shown in FIG. 3 each of the arms complete 270 degrees of winding, as the length of each arm in both the first and second pluralities of four spiral arms 221, 222 traces an arc of 270 degrees about a point centred on the central anchor 230.

The arms of the first plurality of four spiral arms 221 and the second plurality of four spiral arms 222 intersect in such a way that the flexure comprises 5 concentrically nested quatrefoils, with concentrically adjacent quatrefoils rotated by 45 degrees relative to each other. As in the embodiment shown in FIGS. 1 and 2, the points at which arms from the first plurality of four spiral arms 221 and the second plurality of four spiral arms 222 meet or cross are the points at which concentrically adjacent quatrefoils meet.

Figure 4:
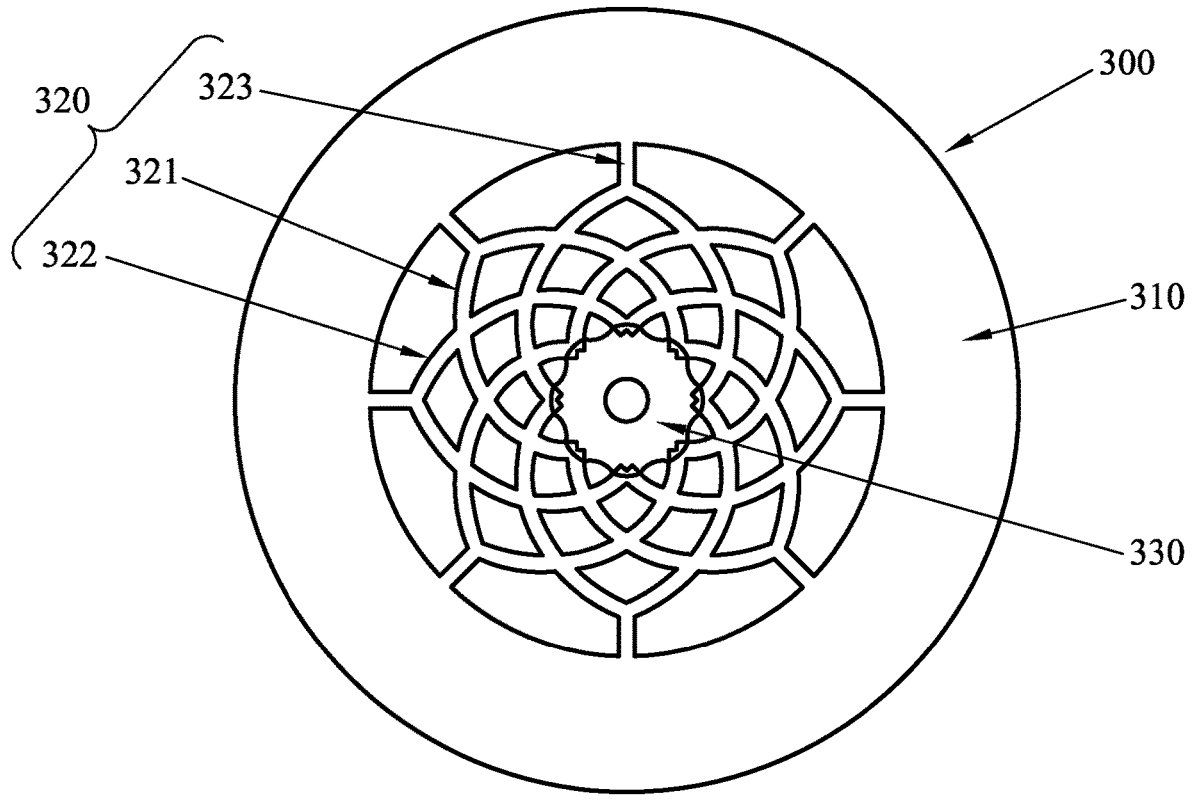
FIG. 4 shows a top view of an inertial sensor according to a second alternative embodiment of the first or second aspect of the invention.

FIG. 4 is a schematic illustration of a plan view of an inertial sensor 300 in accordance with an alternative embodiment of the invention. The inertial sensor 300 of this alternative embodiment also comprises a central anchor 330, a ring shaped proof mass 310, and a flexure 320. The proof mass 330 is identical to that of the embodiment shown in FIGS. 1, 2 and 3.

This embodiment differs from that shown in FIGS. 1 and 2 in that the embodiment shown in FIG. 4 comprises a flexure 320 further comprising a first plurality of eight spiral arms 321, a second plurality of eight spiral arms 322, and eight radial spokes 323. The eight radial spokes 323 are equally spaced at 45 degree intervals about the central anchor 330. Additionally, the central anchor 330 has a different shape to that of the central anchors in the embodiments shown in FIGS. 1, 2 and 3 in order to accommodate the different number of arms.

In the embodiment shown in FIG. 4 each of the arms complete 90 degrees of winding, as the length of each arm in both the first and second pluralities of 8 spiral arms 321, 322 traces an arc of 90 degrees about a point centred on the central anchor 330.

An alternative way to describe the shape of the flexure 320 in FIG. 4 is that it comprises a plurality of concentrically nested, similar shapes, each comprising eight lobes. Each of the concentrically nested shapes have 8-fold rotational symmetry. Each of the concentrically nested shapes comprising eight lobes may be considered to be formed by the outer perimeter of the overlap of two identical quatrefoils, offset by a 45 degree rotation from one another. The arms of the first plurality of eight spiral arms 321 and the second plurality of eight spiral arms 322 intersect in such a way that the flexure is viewed to comprise four concentrically nested shapes comprising eight lobes, with concentrically adjacent shapes comprising eight lobes rotated by 22.5 degrees relative to each other. The points at which arms from the first plurality of eight spiral arms 321 and the second plurality of eight spiral arms 322 meet or cross are equivalent to the points at which concentrically adjacent shapes comprising eight lobes meet.

Figure 5:
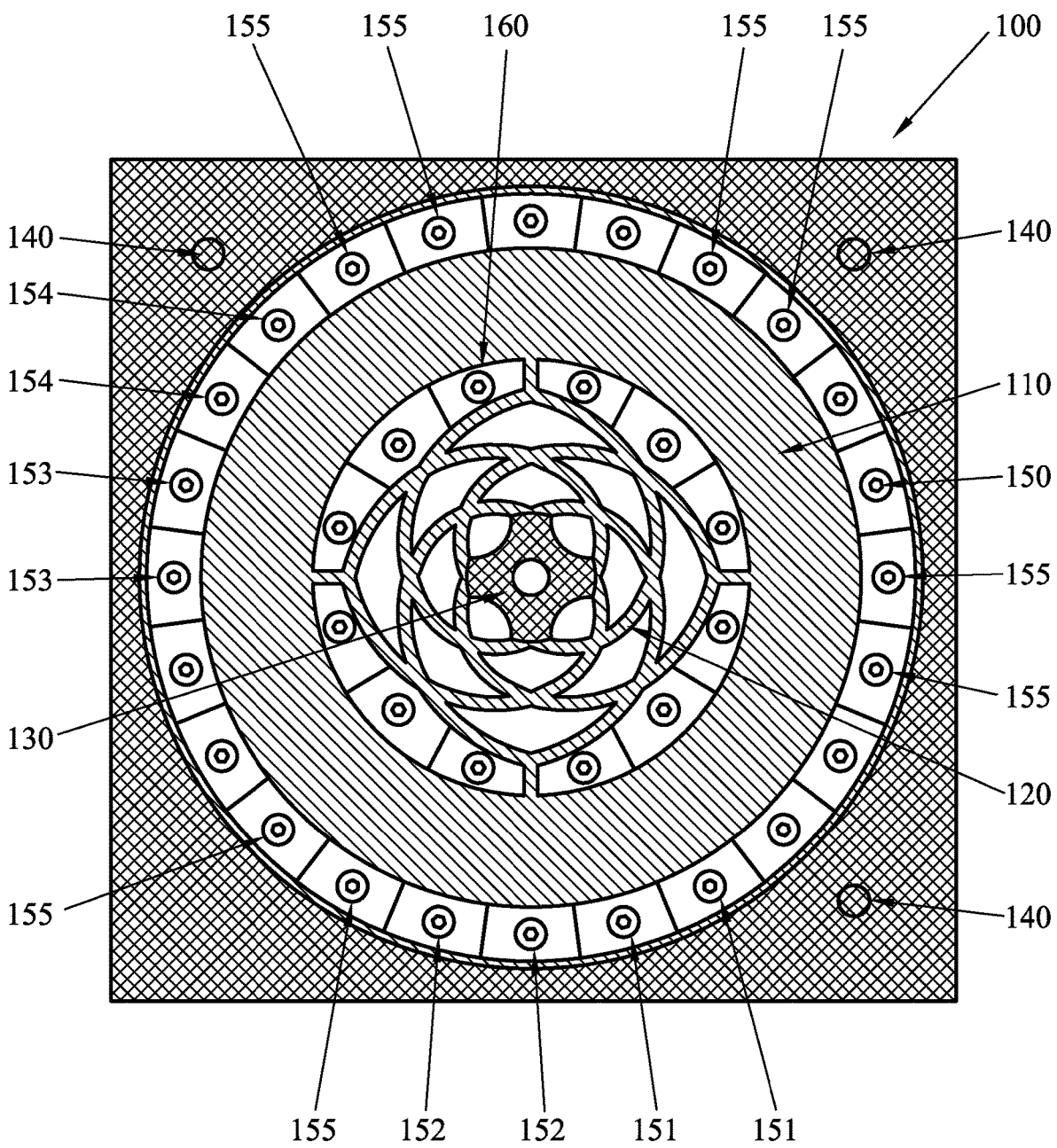
FIG. 5 shows a top view of an inertial sensor according to a first embodiment of the first or second aspect of the invention, showing the electrode arrangement.

FIG. 5 is a schematic illustration of an electrode arrangement of an inertial sensor 100 in accordance with a particular embodiment of the invention. The arrangement of the proof mass 110, flexure 120 and central anchor 130 is identical to that shown in FIGS. 1 and 2.

In this particular embodiment, the plurality of electrodes consists of a set of 12 electrodes 160 that are arranged inside of the proof mass 110, and a set of 24 electrodes 150 that are outside of the proof mass 110. Each set of 12 and 24 electrodes are arranged in one of two concentric circles centred on the central anchor 130. Electrodes in each set are evenly spaced around each of the circles. Each of the electrodes in the set of 12 electrodes 160 positioned inside of the proof mass 110 are substantially identical to one another. Also, each of the electrodes in the set of 24 electrodes 150 positioned outside of the proof mass 110 are substantially identical to one another.

Each electrode in the plurality of electrodes may be used to perform a function of the inertial sensor in use. These functions include, but are not limited to driving the proof mass 110 in the first or second mode of vibration, sensing variations in capacitance when the proof mass 110 vibrates in the first or second mode of vibration, or applying a bias voltage to aid in matching the resonant frequencies of the first and second modes of vibration. The electrodes that are used to perform these functions may be referred to as drive electrodes, sense electrodes and mode-matching electrodes respectively.

Each drive electrode is positioned adjacent to the proof mass 110. Each drive electrode is configured to generate an electrostatic force which acts upon the proof mass 110. Each sense electrode is positioned adjacent to the proof mass 110. Each sense electrode is configured to detect variations in capacitance when the proof mass 110 oscillates in a mode of vibration.

In use, a DC bias voltage is applied to the inertial sensor 100, such that the central anchor 130, flexure 120, and proof mass 110 are electrostatically biased. The DC bias voltage is applied to the inertial sensor at bias points 140. A DC bias voltage enables electrostatic drive and capacitive sense for both vibrational modes using signals at both frequencies of the vibrational modes. The method of operation of the inertial sensor 100 is described in detail in FIGS. 12 and 13 and their respective descriptions.

In the embodiment of FIG. 5, the first set of drive electrodes 151 and the first set of sense electrodes 153 are arranged adjacent to antinodes of the driving mode of the proof mass 110. The second set of drive electrodes 152 and the second set of sense electrodes 154 are arranged adjacent to the antinodes of the sensing mode of the proof mass 110. However, the arrangement of which electrodes perform which functions may vary.

The embodiment of FIG. 5 includes mode-matching electrodes 155. Mode-matching electrodes 155 may be located either inside of outside of the proof mass 610, but in this particular embodiment shown in FIG. 5 they are located outside of proof mass 610. Each mode-matching electrode 155 is positioned adjacent to the proof mass 110. Each mode-matching electrode 155 is configured to generate an electrostatic force which acts upon the proof mass 110 to locally adjust the stiffness of the proof mass 110.

Figures 6A, 6B:
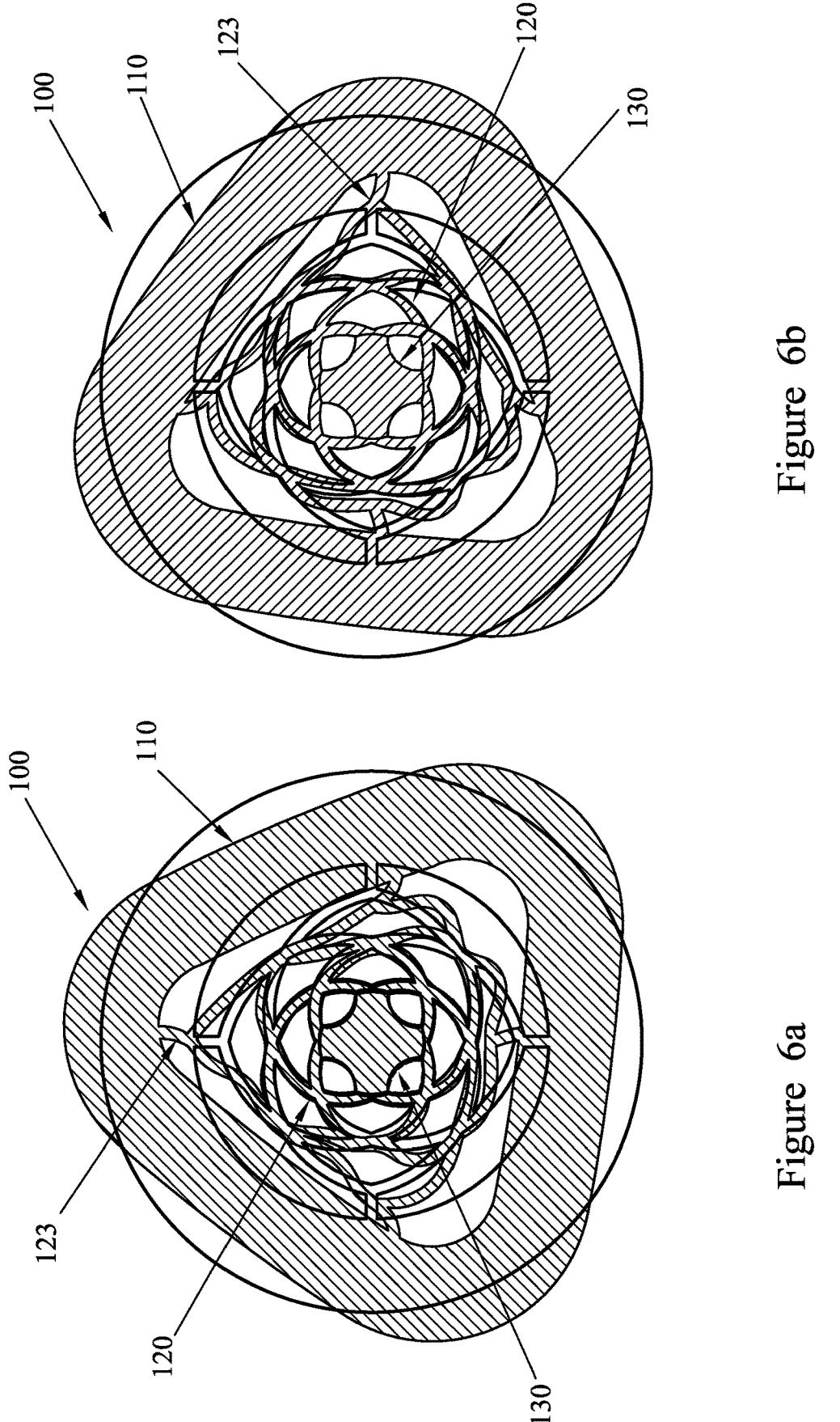
FIGS. 6a and 6b shows two degenerate modes of vibration of a first embodiment of the first or second aspect of the invention.

FIGS. 6a and 6b are COMSOL Multiphysics® simulations of two of the degenerate modes of vibration that may be used in the driving and sensing of the inertial sensor 100 when in use. These two vibration modes may be referred to as cos 3θ modes. In use, one of these degenerate modes of vibration may be driven by the first set of drive electrodes 151, not shown in FIGS. 6a and 6b. This first mode of vibration is referred to as the driving mode as previously. As a result of a Coriolis force generated by an angular velocity of the inertial sensor, energy will be coupled into the other of the two degenerate modes of vibration, then referred to as the sensing mode as previously. The outline of the stationary inertial sensor 100 is also included for reference. It can be seen that significant localised strain of the proof mass 110 occurs during the vibration in these two modes. Additionally, the simulation shows significant strain on the four radial spokes 123. Advantageously, there is relatively low strain in both of the degenerate modes of vibration on the central portion of the flexure 120, near the second ends of the arms, and the central anchor 130. This localised relatively low strain in both of the degenerate modes of vibration reduces energy loss through anchor losses, resulting in an increased quality factor for these modes of vibration. The actual strain experienced by the inertial sensor in use may be less than or more than that represented in FIGS. 6*a* and 6*b*.

Figure 7A:
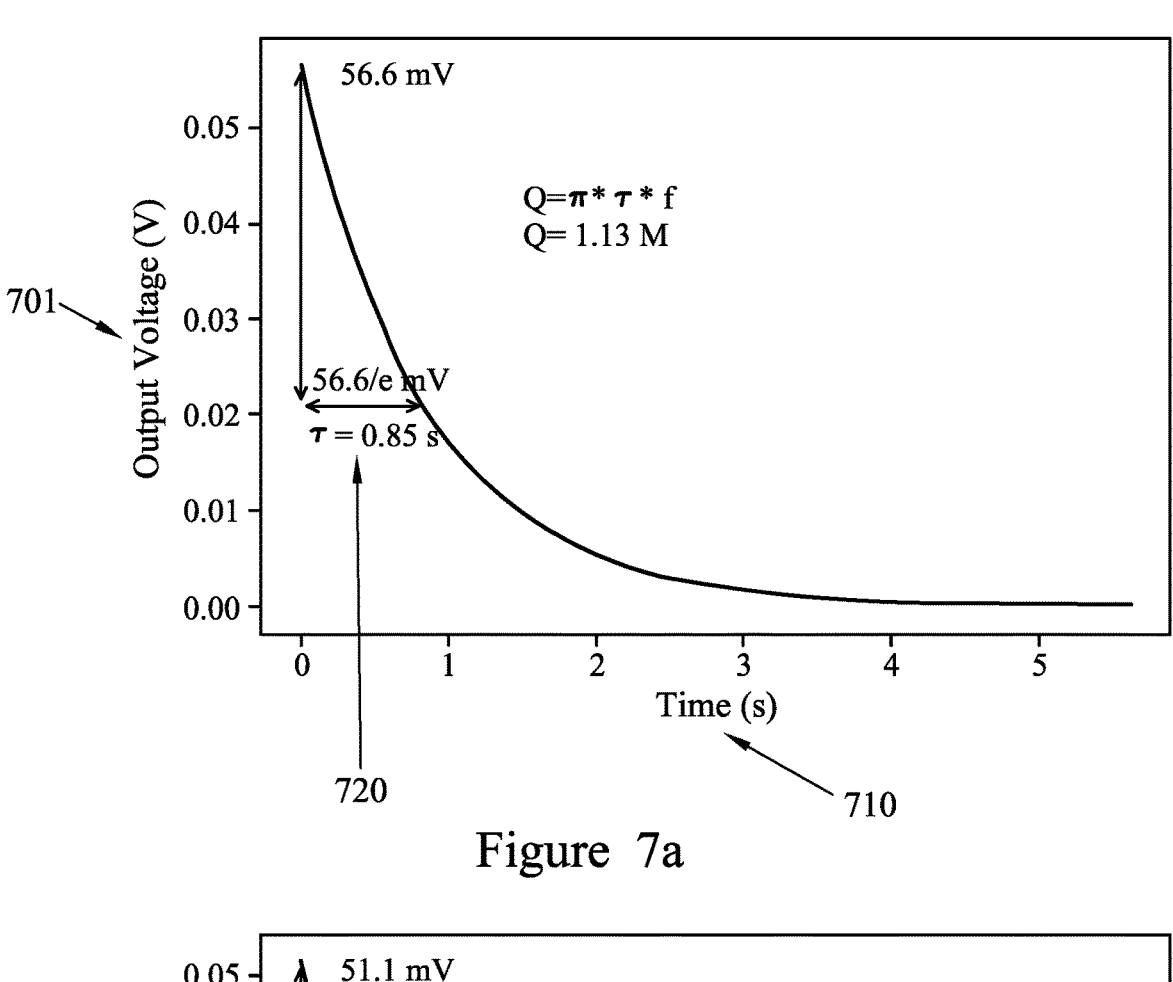
FIGS. 7a and 7b shows the ring-down responses of the degenerate modes of vibration of 6a and 6b.
Figure 7B:
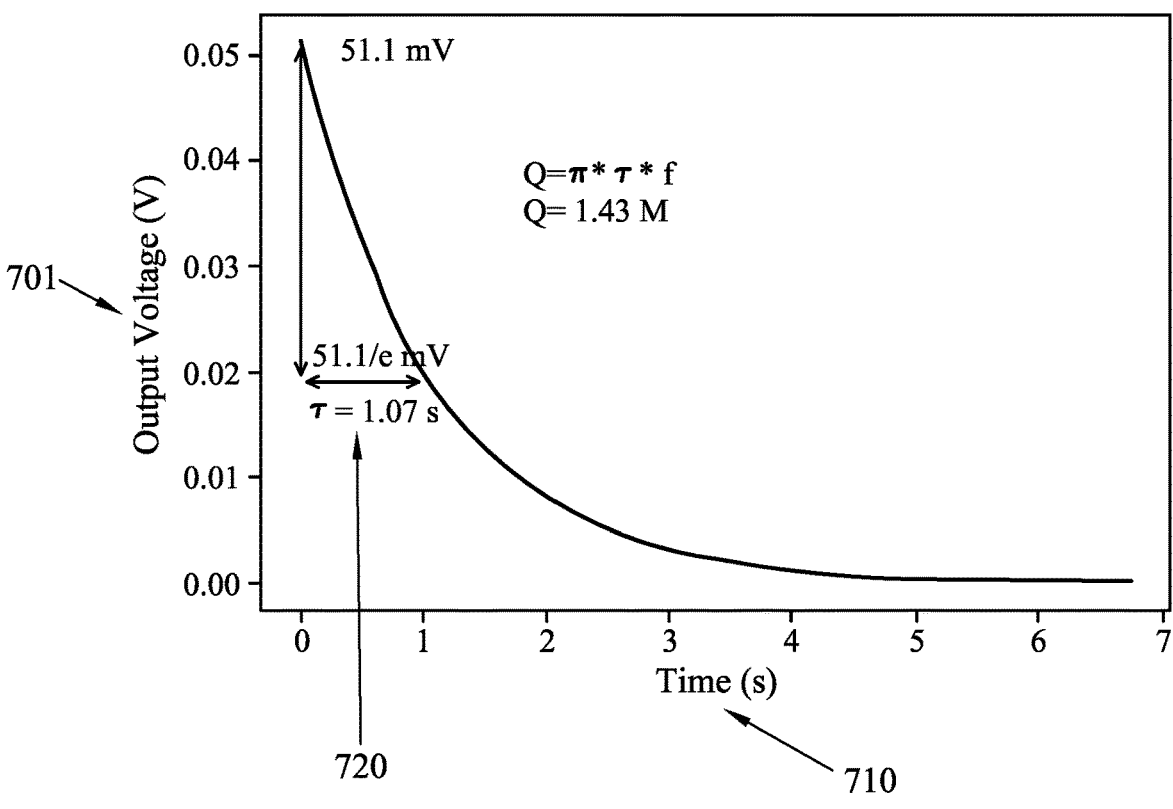

FIGS. 7*a* and 7*b* are data plots showing ring-down responses of the driving and sensing modes of vibration respectively. The driving and sensing modes of vibration measured are identical to those shown in FIGS. 6*a* and 6*b*.

The output voltage 701 is directly proportional to the amplitude of vibration of the driving and sensing modes of vibration. The output voltage 701 is measured using a lock-in amplifier. Quality factors for the driving and sensing modes of vibration are calculated from the ring-down response using equation (1).

$$Q = \Pi \times T \times f \tag{1}$$

The decay time 720, $\tau$, is the time taken for the output voltage to decay to 1/e of the output voltage 701 at time 710 equals zero. The frequency of the mode of vibration is denoted by f. Both the driving and sensing modes of vibration show measured quality factors in excess of 1.1 million.

Figure 8:
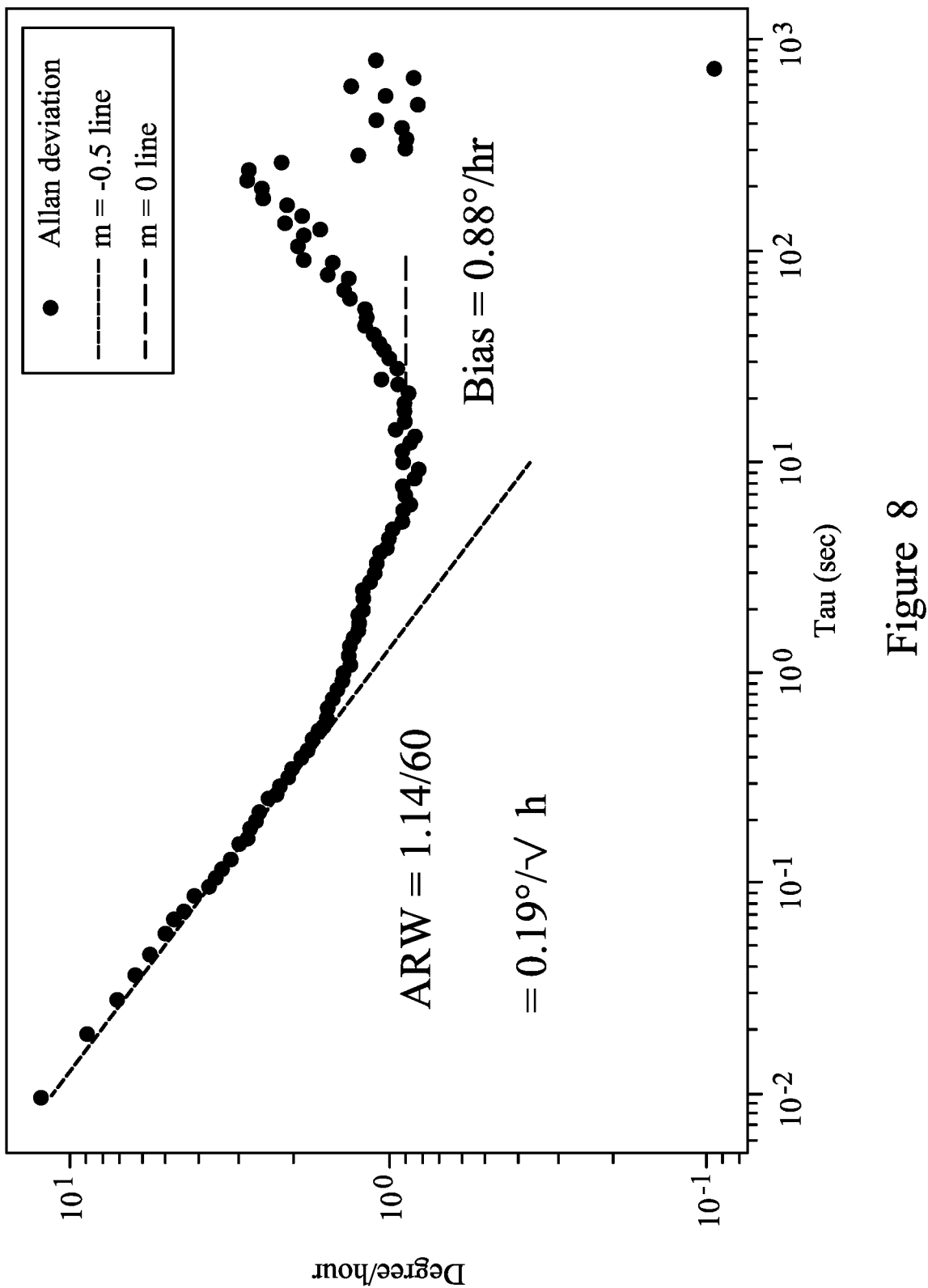
FIG. 8 shows an Allan deviation plot for an inertial sensor according to a first or second embodiment of the first or second aspect of the invention.

FIG. 8 is an Allan deviation plot, displaying data collected from an inertial sensor as in FIGS. 1, 2 and 5 and described previously. The data is measured at zero input rotation about an axis perpendicular to the first plane. ARW is shown to be 0.019°/√h, and BI is shown to be 0.88°/h.

The angle random walk (ARW) and bias instability (BI) are key metrics to evaluate and compare the performances of gyroscopic inertial sensors. Bias may be defined as the average over a specified time of gyroscopic output measured at specified operating conditions that has no correlation with input rotation or acceleration. Bias is typically expressed in degrees per hour (°/h). Bias instability may be defined as the random variation in bias as computed over specified finite sample time and averaging time intervals. Bias instability is also typically expressed in degrees per hour (°/h). Angle random walk may be defined as the angular error build-up with time that is due to white noise in angular rate. Angle random walk is typically measured in degrees per square root of hour (°/h).

Figure 9:
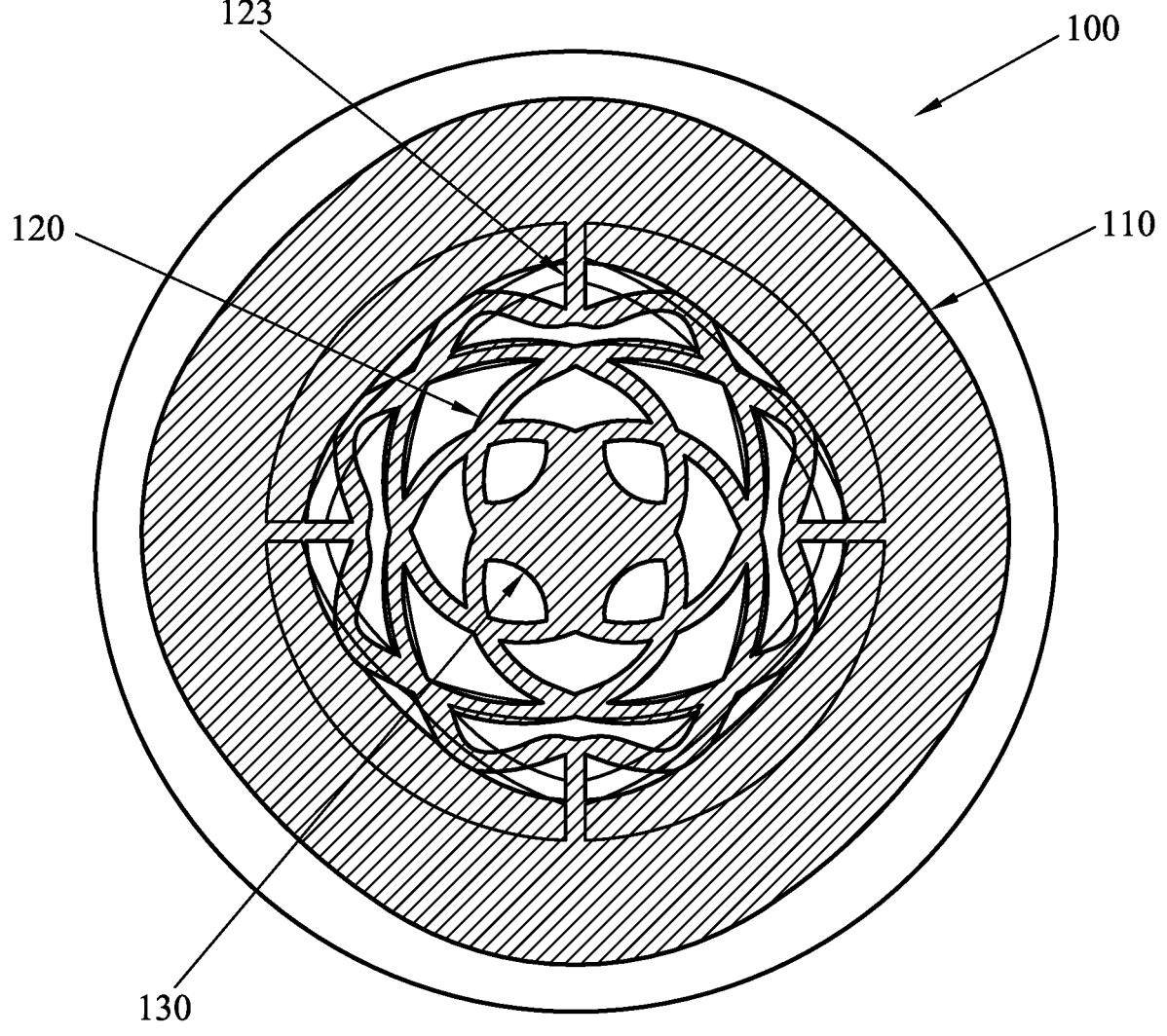
FIG. 9 shows a first alternative mode of vibration of a first embodiment of the first or second aspect of the invention.
Figure 10:
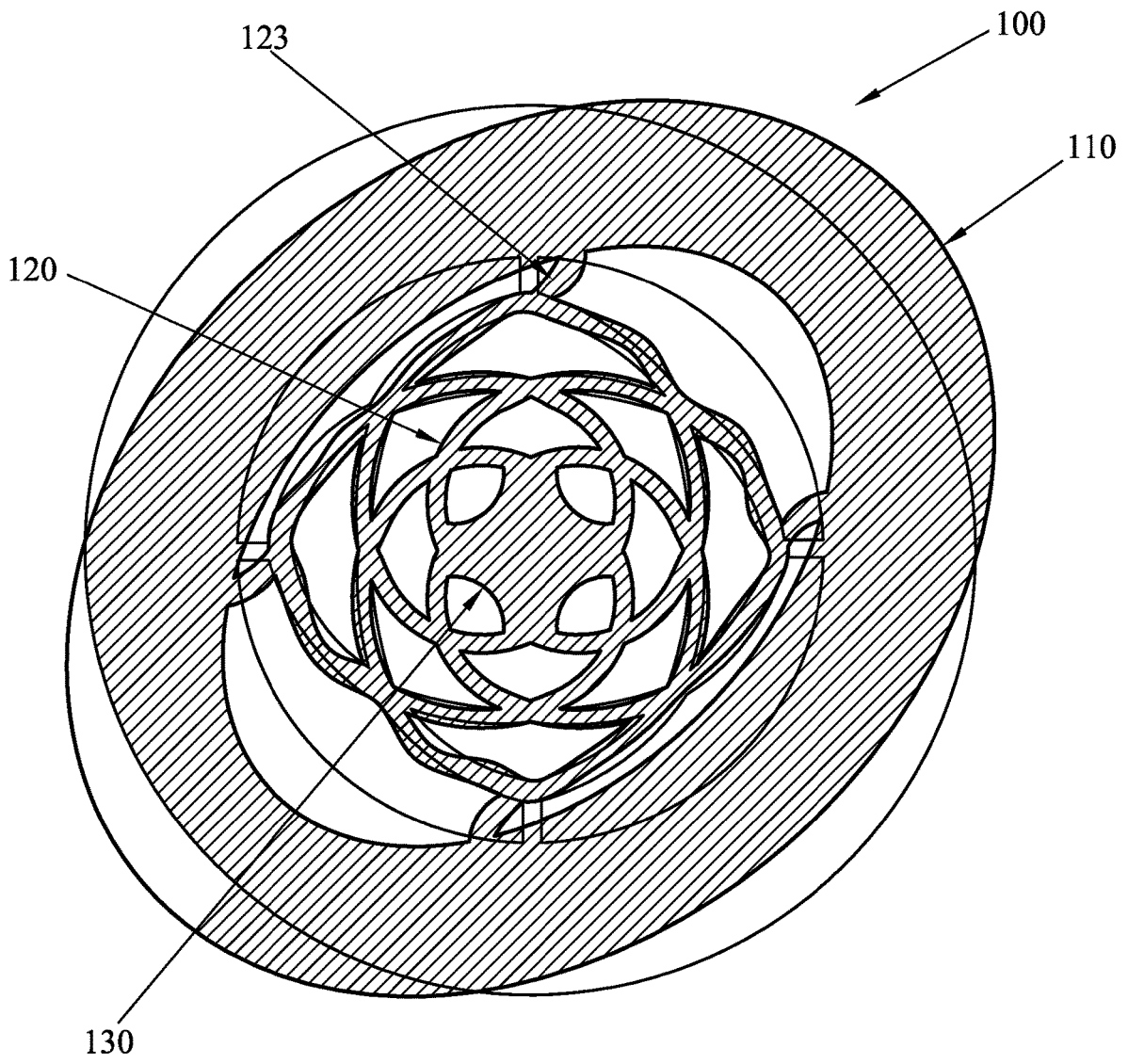
FIG. 10 shows a second alternative mode of vibration of a first embodiment of the first or second aspect of the invention.

FIGS. 9 and 10 are COMSOL Multiphysics® simulations of two alternative vibrational modes of the inertial sensor of FIGS. 1, 2 and 5, described previously. FIG. 9 illustrates a vibrational mode that may be referred to as the 560 KHz vibrational mode. FIG. 10 illustrates a vibrational mode that may be referred to as the primary wine glass vibrational mode, or may instead be referred to as the cos (2θ) vibrational mode. Both the 560 KHz vibrational mode and primary wine glass vibrational mode also display lower strain on the central portion of the flexure 120, near the second ends of the arms, and the central anchor 130 relative to the strain on the proof mass 110 and radial spokes 123. This is advantageous in a similar way to the modes of vibration shown in FIGS. 6*a* and 6*b*. The effect of reduced strain close to the central anchor 130 results in reduced energy loss through anchor losses, resulting in an increased quality factor for both modes of vibration.

As both the 560 KHz and the primary wine glass vibrational modes have been shown to demonstrate high quality factors, the inertial sensor utilised with either the 560 KHz or the primary wine glass vibrational mode may be implemented in high-end resonant sensor and timing and frequency control applications.

Figure 11:
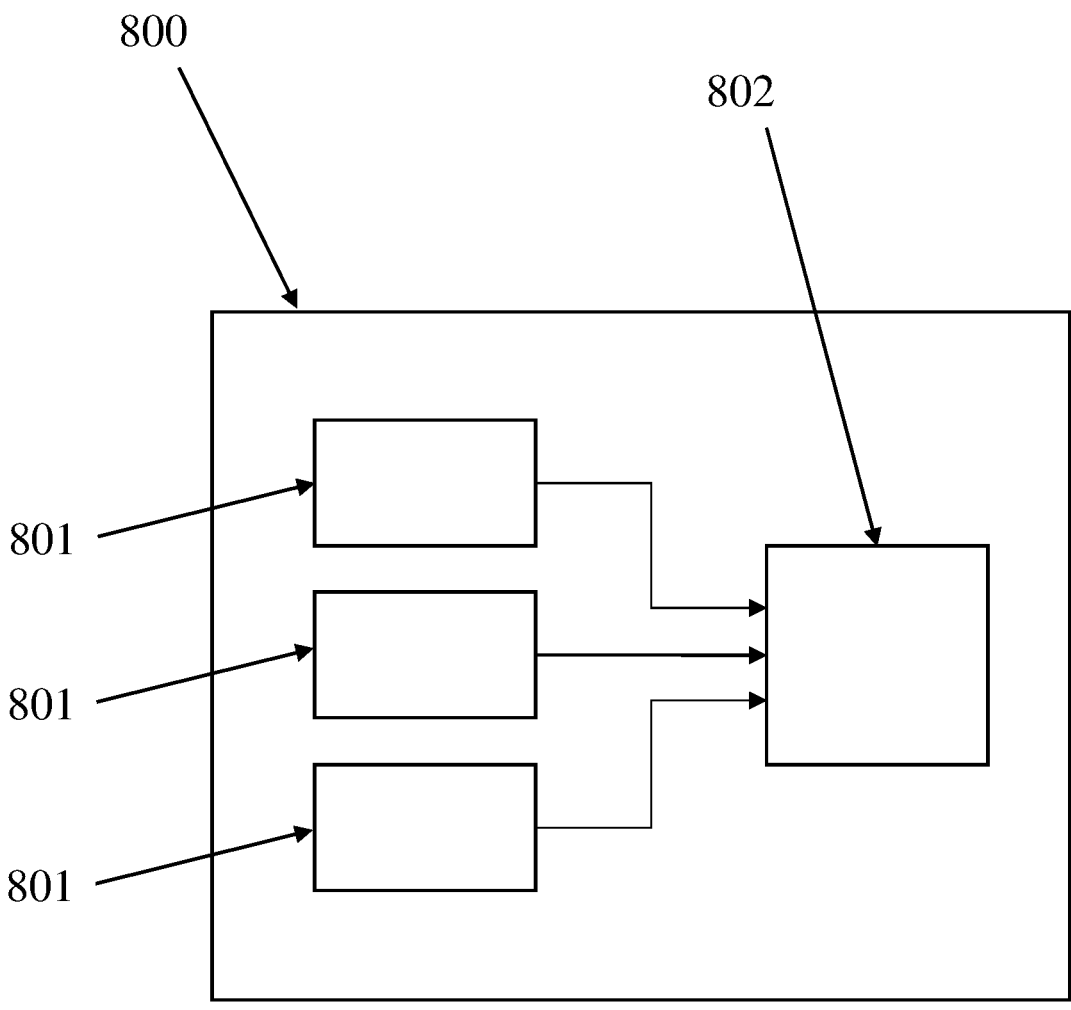
FIG. 11 is a schematic illustration of a navigation system according to the third aspect of the invention, comprising an inertial sensor as described in any embodiment according to the first or second aspect of the invention.

The inertial sensors described previously may be used in a navigation system. FIG. 11 is a schematic of an example navigation system 800 according to the third aspect of the invention, comprising three inertial sensors 801 according to the first or second aspect of the invention. The navigation system 800 further comprises a navigation computer 802 comprising a memory. The signals from the three inertial sensor are inputted into the navigation computer. The navigation computer processes the signals from the three inertial sensors, and calculates the acceleration, velocity and position of the navigation system 800 based on the signals. The navigation system may be used in autonomous surface or subsurface navigation, geo-referencing, mapping and surveying, transportation, aerospace, and automotive applications.

Figure 12:
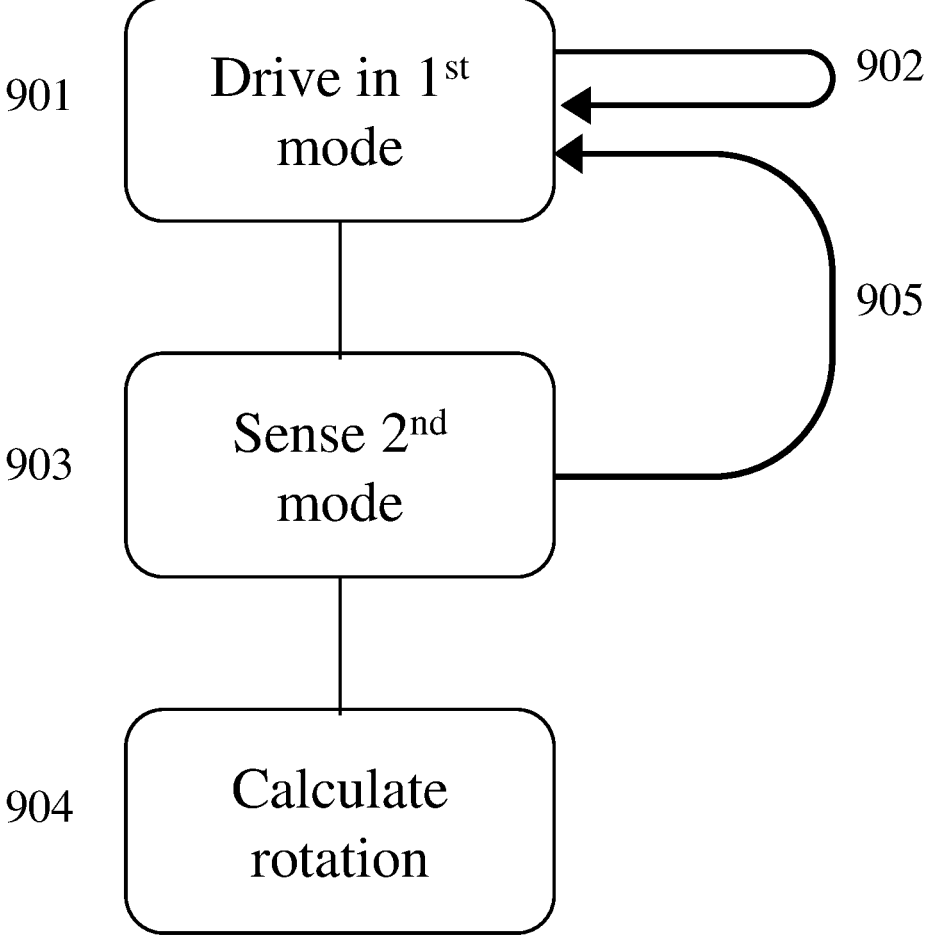
FIG. 12 shows a first method of inertial sensing according to the fourth aspect of the invention, using an inertial sensor as described in any embodiment according to the first or second aspect of the invention.

FIG. 12 is a schematic of a method of operation according to the fourth aspect of the invention of an inertial sensor according to the first or second aspect of the invention. The inertial sensor is first driven in a first mode of vibration 901, referred to as the driving mode. This is achieved through a combination alternating and DC voltages being applied to a first set of drive electrodes relative to the proof mass.

A first set of sense electrodes sense the response of the proof mass to being driven in the driving mode. A first feedback loop 902 utilises the first set of sense electrodes and the first set of drive electrodes. The first feedback loop 902 is configured to regulate the frequency, amplitude, phase, or other characteristics of the driving mode.

Variations in capacitance when the proof mass oscillates in the sensing mode may be detected 903 by a second set of sense electrodes. The amplitude of the vibration of the sensing mode may then be calculated from the variations in capacitance when the proof mass oscillates in the sensing mode. To achieve this, the amplitude of the vibration of the sensing mode may have to first be separated from the amplitude of the vibration of the driving mode. The angular rotation may then be calculated 904 from the amplitude of the vibration of the sensing mode.

In order to enhance the sensitivity of the gyroscope, mode-matching 905 may be used. This process comprises detecting the difference in frequencies of the driving mode and the sensing mode, and applying voltages to mode-matching electrodes. In use, when a voltage difference is present between a mode-matching electrode and the proof mass, an electrostatic force is generated. This allows the stiffness of the proof mass to be locally adjusted. Therefore, the driving mode and sensing modes frequencies of the inertial sensor can be relatively adjusted using the mode-matching electrodes, to ensure that the driving mode and sensing mode frequencies are accurately matched.

This method of detecting angular rotation is referred to as open loop sensing.

Figure 13:
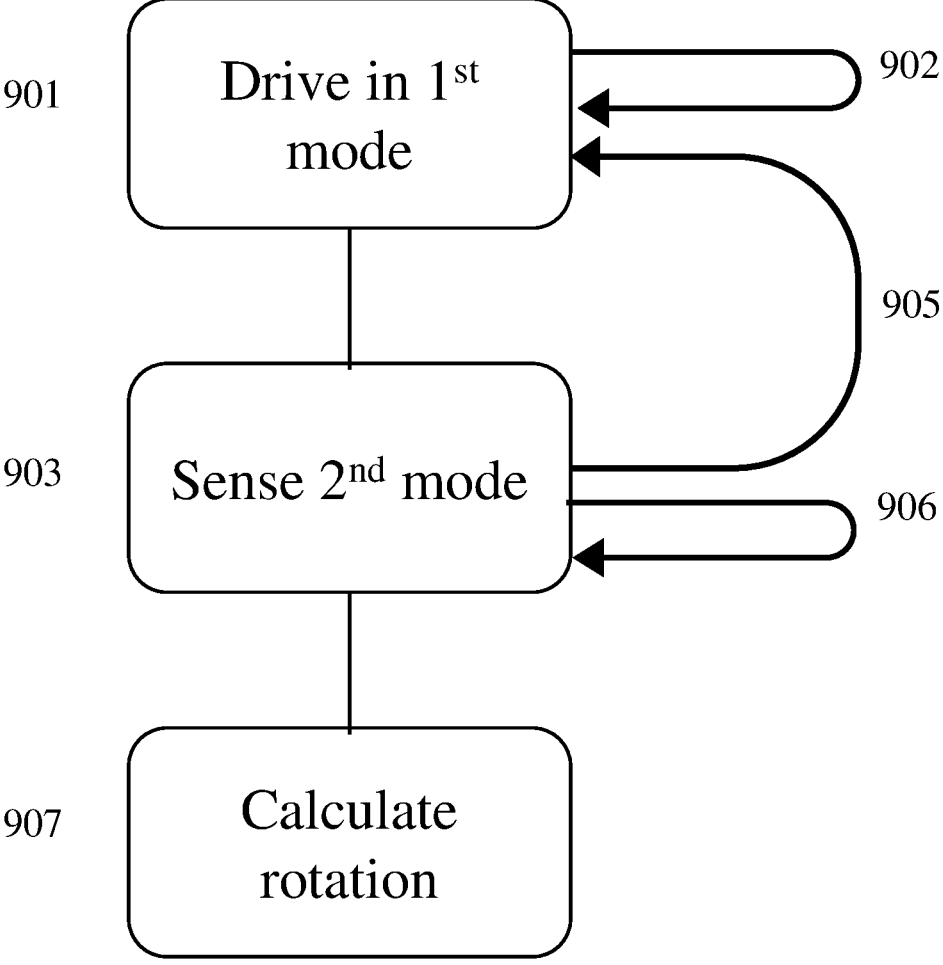
FIG. 13 shows a second method of inertial sensing according to the fourth aspect of the invention, using an inertial sensor as described in any embodiment according to the first or second aspect of the invention.

FIG. 13 is a schematic of an alternative method of operation according to the fourth aspect of the invention, of an inertial sensor according to the first or second aspect of the invention. As in open loop sensing, the inertial sensor is first driven in a first mode of vibration 901, and a first feedback loop 902 is configured to regulate the frequency, amplitude, phase, or other characteristics of the driving mode, and the variations in capacitance when the proof mass oscillates in the sensing mode may be detected 903 by a second set of sense electrodes. Additionally, as in open loop sensing mode control, the process of mode-matching 905 may be used.

Where the method of FIG. 13 differs from that of FIG. 12, is that a second set of drive electrodes are used to generate an electrostatic force which acts upon the proof mass. A second feedback loop 906 utilises the second set of sense electrodes, and second alternating voltages are applied to the second set of drive electrodes. These second alternating voltages from the second set of drive electrodes exert forces on the proof mass, and are configured to reduce the amplitude of the response of the sensing mode to zero using the second feedback loop 906. The angular rotation is then calculated in step 907. The amplitude of the second alternating voltages required to reduce the amplitude of the vibration of the sensing mode to zero is employed to calculate the angular rotation experienced by the inertial sensor.

This method of detecting angular rotation is referred to as closed loop sensing mode control or force-to-rebalance sense mode control.

Figure 14:
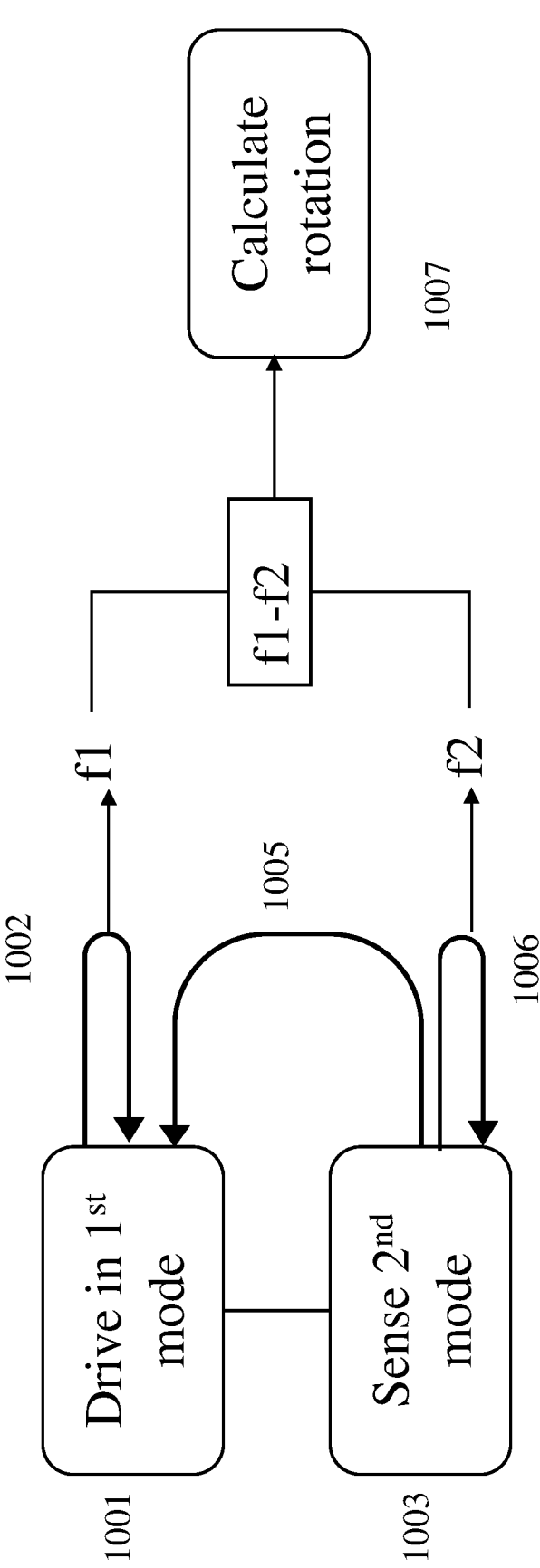
FIG. 14 shows a further method of inertial sensing according to the fourth aspect of the invention, using an inertial sensor as described in any embodiment according to the first or second aspect of the invention.

FIG. 14 is a schematic of a further alternative method of operation according to the fourth aspect of the invention, of an inertial sensor according to the first or second aspect of the invention. As in open and closed loop sensing mode control, the inertial sensor is first driven in a first mode of vibration 1001, and a first resonance tracking feedback loop 1002 is configured to regulate the amplitude, phase, or other characteristics of the driving mode.

Similar to the operation of drive mode in FIG. 14, a second set of drive electrodes are used to generate an electrostatic force which acts upon the proof mass. A second feedback loop 1006 utilises the second set of sense electrodes, and second alternating voltages are applied to the second set of drive electrodes. The second resonance tracking feedback loop 1006 is configured to regulate the amplitude, phase, or other characteristics of the sensing mode 1003.

Additionally, as in open and closed loop sensing mode control, the process of mode-matching 1005 may be used.

Where the method of FIG. 14 differs from that of FIGS. 12 and 13, is that the rotation is calculated 1007 based on the resonant frequencies of the first and second modes of vibration, denoted by f1 and f2 respectively. The difference between the resonant frequencies denoted by f1–f2 is calculated in order to estimate the angular rotation rate.

The invention claimed is:

1. An inertial sensor comprising:
   a central anchor;
   a proof mass, wherein the proof mass surrounds the central anchor;
   a flexure, the flexure having a shape comprising a first set of spiral arms, the first set of spiral arms comprising a first plurality of N spiral arms and a second plurality of N spiral arms, where N is an integer greater than 1, each of the arms connected between the central anchor and the proof mass and lying in a first plane, each of the arms of the first plurality of N spiral arms winding about the central anchor in a first sense and each of the arms of the second plurality of N spiral arms winding about the central anchor in a second sense, the second sense being opposite to the first sense; and
   a plurality of electrodes comprising,
      at least one drive electrode for driving the proof mass in a first mode of vibration, and
      at least one sense electrode for sensing a response of the proof mass in a second mode of vibration.

2. An inertial sensor according to claim 1, wherein the arms of the first plurality of N spiral arms are equally spaced at 360/N degree intervals about the central anchor.

3. An inertial sensor according to claim 1, wherein the arms of the second plurality of N spiral arms are equally spaced at 360/N degree intervals about the central anchor.

4. An inertial sensor according to claim 1, wherein each of the arms in the first plurality of N spiral arms meets or crosses all of the arms from the second plurality of N spiral arms at least once.

5. An inertial sensor according to claim 1, wherein the flexure exhibits N-fold rotational symmetry about an axis perpendicular to the first plane.

6. An inertial sensor according to claim 1, wherein the central anchor, flexure and proof mass each exhibit N-fold rotational symmetry about an axis perpendicular to the first plane.

7. An inertial sensor according to claim 1, wherein the flexure has a shape comprising a plurality of nested quatrefoils, with each quatrefoil rotated by 45 degrees relative to adjacent quatrefoils.

8. An inertial sensor according to claim 1, wherein the flexure has a shape comprising a second set of spiral arms nested concentrically around the first set of spiral arms, the second set of spiral arms comprising a first plurality of N spiral arms and a second plurality of N spiral arms, each of the arms of the first plurality of N spiral arms winding about the central anchor in a first sense and each of the arms of the second plurality of N spiral arms winding about the central anchor in a second sense, the second sense being opposite to the first sense, wherein the arms of the second set of spiral arms may have a different curvature or shape to the arms of the first set of spiral arms.

9. An inertial sensor according to claim 8, wherein the flexure has a shape comprising further sets of spiral arms, wherein the sets of spiral arms are concentrically nested.

10. An inertial sensor according to claim 1, wherein each arm has a first end connected to the central anchor and a second end connected to the proof mass, wherein the first end connects to the central anchor at a point on the central anchor that is furthest from the second end of the arm.

11. An inertial sensor according to claim 1, wherein the proof mass is ring shaped.

12. An inertial sensor according to claim 1, wherein the thickness of the proof mass is greater than the thickness of the flexure.

13. An inertial sensor according to claim 1, wherein the flexure has a shape further comprising a plurality of N radial spokes, wherein each of the radial spokes are connected to the proof mass.

14. An inertial sensor according to claim 1, wherein each of the radial spokes are connected to at least one arm from the first plurality of N spiral arms or the second plurality of N spiral arms.

15. An inertial sensor according to claim 1, wherein N is an integer multiple of 4.

16. An inertial sensor according to claim 1, wherein the plurality of electrodes comprises at least one electrode positioned outside of the proof mass.

17. An inertial sensor according to claim 1, wherein the inertial sensor is a micro-electro-mechanical system or MEMS device.

18. A navigation system comprising an inertial sensor according to claim 1.

19. A method of inertial sensing using an inertial sensor according to claim 1, comprising the steps of;

driving the proof mass in the first mode using at least one drive electrode;

sensing the response of the proof mass in a second mode using at least one sense electrode;

tuning the frequency of the first mode with respect to the second mode or tuning the frequency of the second mode with respect to the first mode to match the frequencies of the first mode and the second mode; and calculating the value of an input measurand based on the response of the proof mass in the second mode.

20. A method of inertial sensing according to claim 1, wherein the value of the input measurand is calculated based on the difference between the resonant frequency of the first mode and the resonant frequency of the second mode.

\* \* \* \* \*